United States Patent
Dash et al.

(10) Patent No.: US 12,289,806 B2
(45) Date of Patent: Apr. 29, 2025

(54) ELECTROLUMINESCENT CERAMIC MATERIALS

(71) Applicant: FORSCHUNGSZENTRUM JÜLICH GMBH, Jülich (DE)

(72) Inventors: Apurv Dash, Jülich (DE); Robert Mücke, Linnich (DE); Olivier Guillon, Jülich (DE)

(73) Assignee: FORSCHUNGSZENTRUM JÜLICH GMBH (DE)

( * ) Notice: Subject to any disclaimer, the term of this patent is extended or adjusted under 35 U.S.C. 154(b) by 0 days.

(21) Appl. No.: 18/250,192

(22) PCT Filed: Sep. 21, 2021

(86) PCT No.: PCT/EP2021/075939
§ 371 (c)(1),
(2) Date: Apr. 21, 2023

(87) PCT Pub. No.: WO2022/089842
PCT Pub. Date: May 5, 2022

(65) Prior Publication Data
US 2023/0397306 A1    Dec. 7, 2023

(30) Foreign Application Priority Data

Oct. 30, 2020    (DE) .............. 10 2020 213 681.5

(51) Int. Cl.
*H05B 33/14*    (2006.01)
*C09K 11/77*    (2006.01)
*H05B 33/02*    (2006.01)

(52) U.S. Cl.
CPC .......... *H05B 33/14* (2013.01); *C09K 11/7703* (2013.01); *H05B 33/02* (2013.01)

(58) Field of Classification Search
CPC .... H05B 33/14; H05B 33/02; C09K 11/7703; C04B 2235/3244; C04B 2235/666; C04B 35/4508

See application file for complete search history.

(56) References Cited

U.S. PATENT DOCUMENTS

| 5,455,451 A | 10/1995 | Usagawa et al. |
| 5,523,284 A * | 6/1996 | Fagan, Jr. ........... C04B 35/4508 505/121 |
| 2015/0357549 A1* | 12/2015 | Müller ............... H10N 60/0268 505/126 |

FOREIGN PATENT DOCUMENTS

| CN | 1661464 A * | 8/2005 | ............ G03B 21/16 |
| CN | 103187502 B1 | 7/2016 | |

(Continued)

OTHER PUBLICATIONS

2005.*

(Continued)

*Primary Examiner* — Elmito Breval
(74) *Attorney, Agent, or Firm* — Dickinson Wright PLLC

(57) ABSTRACT

A method and a device for generating light and to a use of a component for emitting light is disclosed. In a method for generating light, a component comprising a first material from the group of cuprates is subjected to an electric voltage and/or an electric field at a temperature T below 0° C. such that the component emits light. In this way, a light generation is provided which is accompanied by a substantial energy saving as well as a significantly reduced technical effort and which is also possible at cryogenic temperatures.

20 Claims, 2 Drawing Sheets

(56) References Cited

FOREIGN PATENT DOCUMENTS

| | | |
|---|---|---|
| DE | 19941282 A1 | 3/2001 |
| DE | 102017207804 A1 | 11/2018 |
| EP | 0332448 A2 | 9/1989 |
| KR | 101921547 B1 | 11/2018 |
| TW | 201327912 A1 | 7/2013 |
| WO | 18206595 A1 | 11/2018 |

OTHER PUBLICATIONS

Office Action for German Application No. 10 2020 213 681.5, dated Apr. 22, 2021, 8 pages.
Pawar, et al., "Electroluminescence in High in High TC Y—Ba—Cu—Zr—O Superconductors," Solid State Communications, vol. 67, No. 1, 1988, pp. 47-49, Great Britain.
Cava, "Oxide Superconductors," Journal of the American Ceramic Society, 2000, pp. 5-28, vol. 83, Issue 1.
International Search Report with English Translation and Written Opinion for PCT Application No. PCT/EP2021/075939, dated Dec. 23, 2021, pp. 1-10.
Todkar, et al., "Electroluminescence of Gd-Doped Y—Ba—Cu—O Superconductors," Materials Letters, vol. 9, No. 1, Jul. 1990, 4 pages.
Database WPI, Week 201372, Thomson Scientific, London, 2 pages.

\* cited by examiner

ELECTROLUMINESCENT CERAMIC MATERIALS

CROSS-REFERENCE TO RELATED APPLICATION(S)

This present application is a national stage application of International Patent Application No. PCT/EP2021/075939, filed Sep. 21, 2021, which claims priority to German Patent Application No. 10 2020 213 681.5, filed Oct. 30, 2020, the disclosures of which are hereby incorporated by reference in their entireties.

TECHNICAL FIELD

The invention relates to a method and a device for generating light and to a use of a component for emitting light.

BACKGROUND OF THE ART

In electroluminescence, a material is excited to emit electromagnetic radiation by applying an electric field and/or voltage. This can be visible light, for example. The material is set in an excited state due to the energy applied. When it returns to its ground state, photons are emitted.

This effect is used to generate visible light, for example by means of so-called electroluminescent film. This is used, for example, to illuminate displays or instruments in motor vehicles.

The so-called Nernst lamp is an electrically operated incandescent lamp based on a ceramic filament made of magnesium oxide, zirconium dioxide and yttrium oxide. The electrical conductivity of the filament is based on ionic conduction rather than electrons, as is the case with metallic filaments. The composition of the filament from ceramic materials enables it to be operated in an air atmosphere, so that no technically complex vacuum or inert gas is required. The main disadvantage of the Nernst lamp is that the electrical conductivity of the filament does not occur until high temperatures of about 700° C. are reached. Operation takes place at much higher temperatures of about 1600° C. For this reason, the Nernst lamp additionally requires a heat source to preheat the filament.

The publication "Oxide Superconductors" by Robert J. Cava from the "Journal of the American Ceramic Society" [1] 5-28 describes the development of ceramic superconductors with a focus in copper oxide superconductors from the group of cuprates.

The publication "Electroluminescence in high TC Y—Ba—Cu—Zr—O Superconductors" by S. H. Pawar et al. from "Solid State communications", vol. 67, No. 1, pp. 47-49 describes the electroluminescence of ceramic YBaCuZrO superconductors. These materials are also referred to as high-temperature superconductors.

The publication "Electroluminescence of Gd-Doped Y—Ba—Cu—O Superconductors" by B. M. Todkar et al. from the "Materials Letters", volume 9, number 1 describes the electroluminescence of gadolinium-doped YBaCuO superconductors.

SUMMARY

The invention is based on the task to provide a method, a use as well as a device for the improved generation of light.

DESCRIPTION OF THE DRAWINGS

The figures show.

DESCRIPTION OF THE PREFERRED EMBODIMENTS

Figure 1:
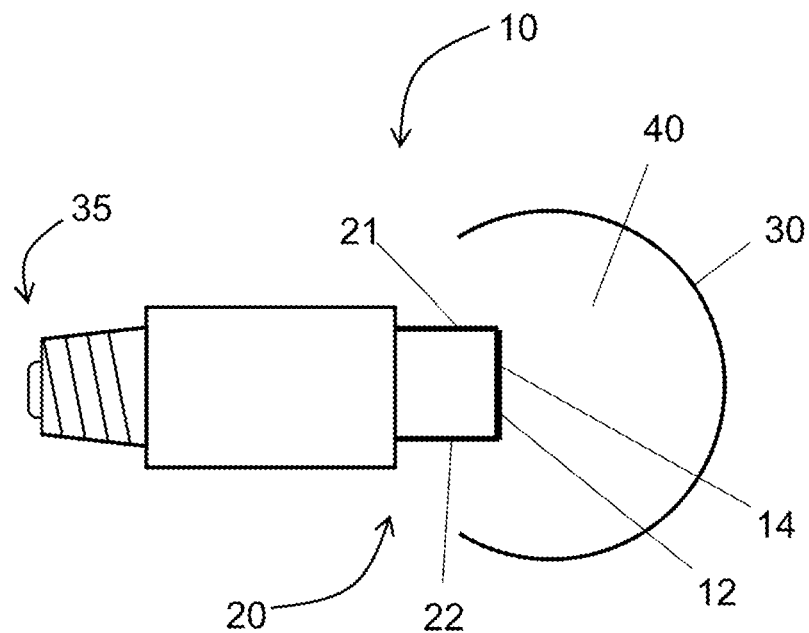
FIG. 1: a first device for generating light.

The task is solved by the method for generating light according to claim 1 as well as by the use and the device according to the additional claims. Embodiments are given in the subclaims.

A method for generating light serves to solve the task. A component comprises a first material selected from the group consisting of cuprates. The component is subjected to an electric voltage and/or an electric field at a temperature T below 0° C., so that the component emits light.

Components with a material from the group of cuprates are already electrically conductive at low temperatures below room temperature and are suitable for emitting light due to electroluminescence. In contrast to other methods, such as the Nernst lamp mentioned at the beginning, no heating of the component is necessary. Thus, the method according to the invention enables light generation, which is accompanied by a substantial energy saving as well as a significantly reduced technical effort. In contrast to conventional methods, this is also possible at cryogenic temperatures.

Another advantage consists in the fact that the materials are oxides and therefore not susceptible to oxidation. This opens up a wide range of applications compared to metals, alloys and other oxidizable materials. Also, light generation using electroluminescence is very energy efficient because the heating of the luminescent material is low.

The wavelength of the emitted light is a material property and depends on the crystal structure of the first material and/or of the component. Accordingly, the first material can be selected to emit light at a wavelength or spectrum suitable for a particular application.

Cuprates are ceramic superconductors which are known as high-temperature superconductors due to their comparatively high transition temperature. In particular, the first material is a ceramic superconductor. Chemical compounds that include a copper-containing anion may be referred to as Cuprates. These may be salt-like cuprates that include oxygen in addition to copper. In particular, however, oxides are meant. Typically, the first material is a substance that has a transition temperature above −196° C., the boiling temperature of liquid nitrogen. In particular, the first material from the group of cuprates has an electrical conductivity at room temperature that is between that of a good conductor and that of an insulator. Said electrical conductivity of the first material can be between $10^4$ S/m and $10^7$ S/m, in particular between $5*10^4$ S/m and $3*10^6$ S/m, preferably between $8*10\ 4$ S/m and $1.2*10^5$ S/m.

The group of cuprates comprises, among others, LaBaCuO, LaSrCuo, YBaCuO, BiSrCaCuO, BiSrCuOCO, TlBaCaCuO, HgBaCaCuO, HgTlBaCaCuO, BaCaCuO, BaCaCuCO, SrKCuOCl. Here, only the included elements are given, but not the correct stoichiometric ratios.

The group of cuprates comprises, among others, $La_4BaCu_5O_{13}$, $La_{2-x}Ba_xCuO$, $La_{1.8}Sr_{0.2}CuO_4$, $YBa_2Cu_3O_7$, $Bi_2Sr_2Ca_2Cu_3O_{10}$, $Bi_2Sr_2CaCu_2O_8$, $Bi_2Sr_2CuO_6$, $HgBa_2Ca_2Cu_3O_8$, $HgBa_2Ca_2Cu_3O_9$, $Y_2Ba_4Cu_7O_{15}$, $Hg_{0.8}Tl_{0.2}Ba_2Ca_2Cu_3O_{8.33}$, $Hg12Tl_3Ba_{30}Ca_{30}Cu_{45}O_{127}$, $HgBa_2CaCu_2O_6$, $Tl_2Ba_2Ca_2Cu_3O_{10}$, $Pb_2Sr_2YCu_3O_8$, $Nd_2CuO_4$, $Ca_{0.84}Sr0.16CuO_2$, $TlBa_2(Eu, Ce)_2Cu_2O_9$, $GaSr_2$ (Y,Ca)Cu$_2$O$_7$, Pb$_2$Sr$_2$Y$_{1-x}$Ca$_x$Cu$_3$O$_8$, Sr$_{3-x}$K$_x$Cu$_2$O$_4$Cl$_2$, Sr$_{2-x}$K$_x$CuO$_2$Cl$_2$, NbSr$_2$(Nd,Ce)2Cu$_2$O$_{10}$, (Sr,Ca)CuO$_2$, YBa$_2$Cu$_3$O$_7$, YBa$_2$Cu$_3$O$_{7-x}$, YBa$_2$Cu$_3$O$_{7-\delta}$, for example with δ between 0.05 and 0.65, also referred to as YBCO, YBaCuO, Y-123, 123 oxide or 123 compound.

Light generation or light emission means the emission of light waves or light rays. In particular, light is generated in an intensity that is visible to the human eye under suitable conditions.

In particular, light is emitted in wavelengths visible to humans between about 400 nm and about 700 nm. It is not excluded that complementarily or alternatively non-visible electromagnetic radiation with longer or shorter wavelengths are emitted, in particular in the range of infrared and/or ultraviolet radiation. These may also be referred to as light.

The temperature T is in particular the temperature of an environment of the component, for example an atmosphere surrounding the component. The component and/or its environment is in particular not heated by an additional heating device. In particular, no heating takes place before or while the component is subjected to the electric voltage and/or the electric field. In one configuration, it is nevertheless not excluded that the temperature T rises selectively, e.g. in the immediate vicinity of the component, to values above 0° C. due to the effect of the electric field and/or the electric voltage.

In particular, the temperature T$_B$ of the component itself is less than 0° C. at the beginning of the effect of the electric voltage and/or the electric field on the component. In particular, the temperature T$_B$ means the temperature of the material inside the component. This can also rise selectively to values above 0° C. due to the effect of the electric field and/or the electric voltage.

The temperature T and/or the temperature T$_B$ can be below room temperature, in particular below 25° C., below 20° C., below 10° C. or at about 0° C.

In particular, the temperature T and/or the temperature T$_B$ is below –20° C., below –40° C., below –50° C., below –70° C., below –80° C., below –90° C., below –100° C., below –110° C., below –120° C. or below –130° C. The respective temperature can be permanently below this temperature.

The temperature T and/or T$_B$ is in particular higher than the transition temperature of the respective first material. At the transition temperature, the electrical resistance tends abruptly towards zero. At lower temperatures, a short circuit occurs due to the lack of electrical resistance and no light emission takes place. In one configuration, the temperature T and/or the temperature T$_B$ is above –250° C., above –225° C., above –200° C., above –180° C., above –160° C., above –150° C., or above –140° C.

In one configuration, an electrical voltage and/or current is applied to the component. The component may be subjected to a current density between 50 mA mm$^{-2}$ and 1000 mA mm$^{-2}$, in particular between 100 mA mm$^{-2}$ and 500 mA mm$^{-2}$. In one configuration, resistance heating occurs due to a current flow through the component, i.e., heating of the component due to the electrical resistance. In particular, the electric field is generated by the electric voltage or current in the component.

In an alternative configuration, the component is arranged in an electrically isolated manner between electrodes to which a voltage is applied. In particular, an alternating voltage is applied so that the component is subjected to an alternating electric field. The underlying effect is also referred to as alternating field excitation.

In one configuration, an AC voltage and/or an AC current is applied to the component. A frequency of the AC voltage and/or AC current may be between 100 Hz and 8000 Hz, preferably, between 200 Hz and 4000 Hz, particularly preferably between 400 Hz and 2000 Hz, and in one configuration between 600 Hz and 1500 Hz. In one configuration, a DC voltage and/or a DC current is applied to the component.

In particular, the component is in the form of a straight or bent wire or pin. In an alternative configuration, the component is in the form of a helix (spiral), such as a single helix or double helix.

In one embodiment, the first material is yttrium barium copper oxide. This material with the empirical formula YBa$_2$Cu$_3$O$_{7-x}$ has a particularly high transition temperature and good availability.

In one further embodiment, the temperature T is lower than –30° C., in particular lower than –60° C. This may alternatively or additionally apply to the temperature T$_B$. In particular, the method according to the invention can be carried out on Mars. The temperature of the Martian atmosphere is –68° C. on an annual average and can drop to –80° C. or –100° C. In this way, a safe and reliable light source which is low in technical effort can be provided for future Mars missions.

In one embodiment, the component has a mass fraction of the first material from the group of cuprates between 50% and 100%. Accordingly, the mass fraction of the first material in the total mass of the component is in said range. In particular, the mass fraction of the first material is thereby below 100% and the component comprises a further material. It has been shown that light generation at low temperatures is also possible if the component is only proportionally a cuprate. This is possible from a cuprate content of about 50%. Preferably, the cuprate is present as a continuous phase. This embodiment allows producing a component with a lower amount of cuprate, which minimizes the technical effort and costs. In particular, the component comprises a further material in addition to the first material. It is possible that the further material does not include cuprate.

In one embodiment, the component has a mass fraction above 0% and at most 50% of a second material. The second material is different from the first material. In particular, it does not include cuprate. In this way, a variety of possibilities are provided for adapting the properties of the light-emitting component to the respective requirements by means of suitable admixtures. Also, a component with a lower amount of cuprate can be produced in this way, which minimizes the technical effort and costs.

In particular, the second material serves to influence the wavelength of the emitted light and/or the radiation behaviour of the component. In this way, suitable materials can generate a frequency spectrum or wavelength spectrum that is optimal for the respective application.

In one configuration, the component includes a mass fraction between 0% and 99% of a second material and a mass fraction between 0% and 99% of a third material, optionally a mass fraction between 0% and 99% of a fourth material, and optionally a mass fraction between 0% and 99% of a fifth material. The mass fractions of the second, third, fourth and/or fifth material may be below 40%. They may be below 20%. They may be below 10%. They may be below 5%. The second, third, fourth and/or fifth material may be an insulating ceramic material.

The second, third, fourth and/or fifth material may be an admixture to the first material. Multiple different admixtures allow fine tuning of the emitted light and/or selective manipulation of other properties.

The second material may be an electrically insulating material and in particular a ceramic material. In one configuration, the second material is zirconium oxide and/or hafnium oxide. These materials are characterized by emitting different shades of white light. Thus, a desired shade of light, such as warm white or cool white, can be adjusted by suitably composing the component of the first and second materials.

In one embodiment, at least a first region, in particular at least a first layer, of the component consists essentially of the first material. At least a second region, in particular at least a second layer, of the component consists essentially of the second material.

In other words, a region-by-region, for example layer-by-layer, arrangement of the two different materials is possible. In one configuration, the component consists of a first layer and a second layer arranged, in particular, immediately adjacent thereto. In one configuration, the component comprises three layers, wherein a second layer is arranged between two first layers. In particular, the three layers are each arranged immediately adjacent. The component may consist of the three layers.

In one configuration, a region of the first material is surrounded by second material. Accordingly, a region of the first material is arranged between second material along at least one viewing direction. The second material may be arranged as a coating of the first material. By this, the light emission may be influenced.

In one embodiment, at least a third region of the component comprises a preferably substantially homogeneous mixture of the first material and the second material.

Thus, at least one region includes a mixture of two different materials that is preferably substantially uniform. The third region may consist of the mixture of the first material and the second material. Homogeneous means in particular a uniform mixture of the different materials. The first material and optionally the second, third, etc. material may consist of solidified particles. In this case, a substantially uniform mixture of the different solidified particles is meant. It is possible in this way to adjust the properties of the component for light generation, such as the wavelength or the radiation behaviour, according to the requirements.

In a further embodiment, the electric field has an electric field strength above 100 V/cm. In particular, the electric field strength is between 500 V/cm and 100 kV/cm. In particular, a mean field strength acting on the component is meant. In one configuration, the electric field strength is between 1 kV/cm and 50 kV/cm and preferably between 5 kV/cm and 20 kV/cm.

Compared to conventional incandescent lamps, the electric field is greater while the current flow is less. The electric field strength of an incandescent lamp with a tungsten filament is in the range of 50 V/cm to 70 V/cm. In the method according to the invention, the electric field strength is in particular above 100 V/cm. Thus, the resistance-related heating due to ohmic losses is low and the efficiency of the conversion of introduced energy into electric light is high.

In a further embodiment, the light emission takes place in an oxygen-containing atmosphere, particularly in air. In other words, the component is surrounded by the oxygen-containing atmosphere, such as ambient air, during light generation. Due to the oxidic properties of the component, light generation can also take place in an oxygen-containing atmosphere, such as ambient air, without any adverse change to the component. Conventional light emitters such as metal filaments would quickly oxidize and become inoperable in an oxygen-containing atmosphere. This embodiment makes it possible to generate light with particularly low technical effort, since advantageously no protective or vacuum atmosphere is required.

A mean grain size of the first material and/or the component may be between 0.1 μm and 100 μm, preferably between 0.5 μm and 50 μm, particularly preferably between 0.8 μm and 25 μm and for example between 1 μm and 10 μm. The average grain size can be determined, for example, by scanning electron microscopy and image data analysis.

In particular, the component is subjected to the electric field under atmospheric pressure. In other words, the method is carried out without applying any pressure. No pressure is built up in addition to the atmospheric pressure. In one configuration, in particular when the method is performed in the earth's atmosphere, the maximum pressure in the component at the beginning and/or shortly before the beginning of the effect of the electric field is less than 1.6 bar, preferably less than 1.4 bar and particularly preferably less than 1.2 bar or less than 1.1 bar.

In one embodiment, the component is a densified (compacted) component, in particular a sintered component.

A densified component is a component that has been produced from a powdered starting material in such a way that the grains of the starting material are firmly bonded to one another in the component. In particular, the component is a sintered component, preferably a sintered ceramic component. Accordingly, for producing the component, a preform of the component or a formless material has been heated and, if necessary, subjected to an increased pressure and densified in this way. Sintering is typically carried out at high temperatures, which are, however, below the melting temperature of the starting materials, so that any existing shape of the workpiece is retained during sintering. Shrinkage of the workpiece may occur as the density of the starting material increases. Through sintering, a solid workpiece is produced, wherein properties such as hardness, compressive strength and thermal conductivity can be influenced by suitable process parameters.

Sintering may be implemented as field-assisted sintering, in which heating is at least partially effected by means of electric current. In this method, also known as field-activated sintering, field assisted sintering technology" (FAST) or spark plasma sintering (SPS), a direct electric current is passed through the powder to be sintered, which leads to further heating by the Joule effect. In addition, a pressure of 50 MPa up to 400 MPa can be built up and/or sintering takes place under protective gas or vacuum. Sintering can also be implemented as flash sintering, which is based on a current flow through the ceramic body in combination with external heating. In this case, heating is first performed externally and, when a specific temperature is exceeded at which the sample becomes sufficiently conductive, a current flow is realized across the sample cross-section.

Prior to sintering, the starting material may be in the form of a green body (green compact), i.e., an article preformed from the starting material. The method may comprise shaping (forming) to produce the green body. This serves to produce the green body, in particular from powdered materials. The aim may be to achieve a packing density that is as homogeneous as possible, i.e. a uniform mass distribution, throughout the green body. Shaping is carried out in particular by pressing, casting and/or plastic shaping. In this way, geometrically demanding components can be produced.

Alternatively or additionally, the starting material may be present in powder form. This enables a particularly simple and fast method. It can thus be introduced as a powder into a mould and subjected to the electric field in this mould.

This embodiment results in a particularly strong and durable component, so that permanent light generation is possible.

In one embodiment, densification is performed by subjecting a starting substance comprising the first material to an electric field at a temperature Tv below 800° C., in particular below 100° C.

The electric field is generated in particular by arranging electrodes on different, for example opposite, sides of the starting material and by applying an electric voltage to the electrodes or realizing an electric current through the electrodes and the starting material.

The temperature Tv means the temperature at the beginning of the effect of the electric field on the starting material. In particular, the starting material is not heated before it is subjected to the electric field. Nevertheless, it is possible that the temperature rises selectively to values above 300° C. or 100° C. due to the effect of the electric field. In particular, however, this temperature is well below 800° C. In particular, the temperature Tv is lower than 700° C., lower than 600° C., lower than 500° C., lower than 400° C., lower than 300° C., lower than 200° C., lower than 150° C., lower than 100° C., lower than 80° C., lower than 70° C., lower than 60° C., lower than 50° C., lower than 40° C., lower than 30° C. or lower than 25° C. It may be equal to or less than the room temperature. Surprisingly, it has been shown that densification similar to a conventional sintering process is possible at these temperatures. The temperature is higher than the transition temperature of the material in question. In one configuration, the starting material is subjected to the electric field for a period of less than 10 min and preferably less than 1 min. In experiments, it has been shown that the method according to the invention allows complete compaction already within the aforementioned short period of time. In particular, the starting material is subjected to the electric field under atmospheric pressure, i.e. without exerting any pressure. The electric field may have an electric field strength above 50 V/cm, in particular an electric field strength between 100 V/cm and 5 kV/cm. The starting substance may comprise further substances, for example a second material and possibly a third, fourth, etc. material.

Another aspect of the invention is a use of a component for emission of light. The component comprises a first material from the group consisting of cuprates. The emission of light occurs at a temperature below 0° C.

In particular, the emission of light occurs by subjecting the component to an electric voltage, an electric field, and/or an electric current. All features, configurations and effects of the method described at the beginning also apply accordingly to the use.

Another aspect of the invention is a device for generating light. The device comprises a component for emitting light, wherein the component includes a first material selected from the group consisting of cuprates. The device further comprises a power supply device for subjecting the component to an electric voltage and/or an electric field for emission of light by the component. The device is configured such that the component has a temperature below 0° C. when light is generated.

All features, configurations and effects of the method described at the beginning also apply accordingly to the device. In one embodiment, the device has a cooling device for cooling the component to a temperature below 0° C. In a further embodiment, the cooling device is configured to cool an atmosphere surrounding the component so that the component can be cooled by the atmosphere.

In the following, exemplary embodiments of the invention will also be explained in more detail with reference to figures. Features of the exemplary embodiments may be combined individually or in a plurality with the claimed subject-matter, unless otherwise indicated. The claimed areas of protection are not limited to the exemplary embodiments.

FIG. 1 shows a schematic representation of a device 10 according to the invention for generating light. It comprises a component 12 for emitting light. The component 12 includes a first material 14 from the group of cuprates. The component 12 has the shape of a straight pin connected to a first conductor 21 and a second conductor 22. In particular, the component 12 is held by the two conductors 21 and 22. The device 10 further comprises a power supply device 20 configured to subject the component 12 to an electric voltage and/or an electric field. In this way, the component 12 can emit light. The power supply device 20 comprises, in addition to the first conductor 21 and the second conductor 22, an electrical connection unit 35 configured in the form of a conventional lamp base. In this way, an electric current can be realized through the component 12 by means of the power supply device 20, which in particular leads to an electric field in the region of the component 12.

The device 10 for generating light further comprises a protective device which ensures a mechanical protection of the component 12 and in particular also of the two conductors 21 and 22. The protective device is in particular produced from a transparent solid material, for example glass. The protective device is in the form of a protective screen 30. In the configuration shown, the protective device is not configured to confine a gas-tight atmosphere around the component 12. In other words, the protective device is configured to allow circulation of gas from the environment of the device 10 around the component 12. This is shown schematically in FIGS. 1 and 2 in that the protective screen 30 has openings on the side shown on the left. In this way, the emission of light can take place in an oxygen-containing atmosphere 40, for example in the ambient air.

The device 10 for generating light is configured to generate light at a temperature below 0° C. For example, it may be used to serve as a light source on Mars. It may include a cooling device for cooling the component and/or an atmosphere surrounding the component. To this end, a protective device may be provided to confine an at least substantially gas-tight atmosphere around the component. The device 10 may be configured to generate incandescent (white-hot) light. In particular, the light emission serves to illuminate at least one object and/or a room.

Figure 2:
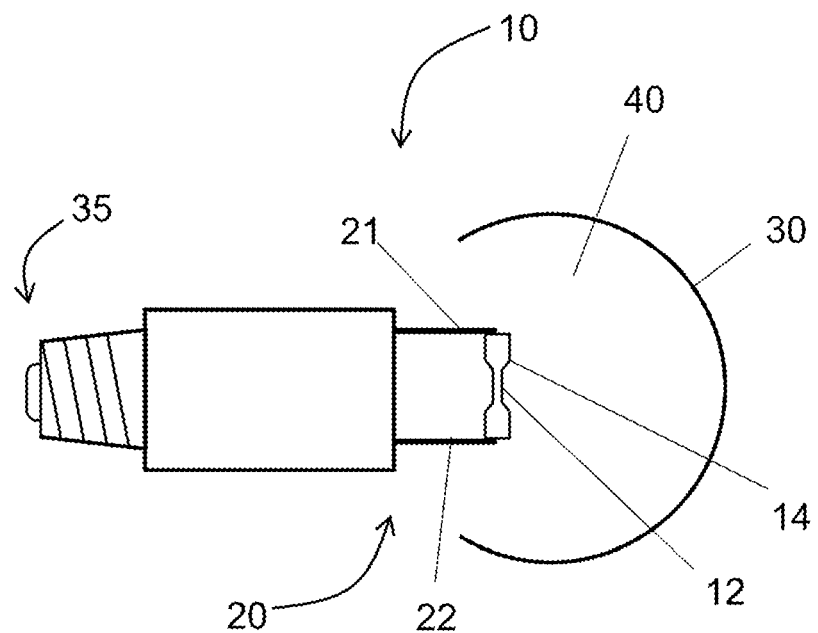
FIG. 2: a second device for generating light.

FIG. 2 shows a schematic representation of an alternative embodiment of the device 10 according to the invention. Deviating from the embodiment shown in FIG. 1, the component 12 is designed here in the form of a dog-bone shape, which is shown only schematically. This shape can be produced with little technical effort. In all other respects, the embodiment shown corresponds to the embodiment shown in FIG. 1, so that reference is made to the above explanations.

Figure 3:
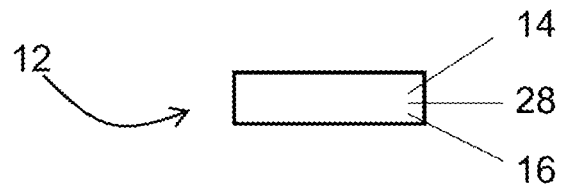
FIG. 3: a first configuration of a component.

FIG. 3 schematically shows a first configuration of a component 12 according to the invention for emitting light. The component 12 comprises a third region 28 comprising a homogeneous mixture of a first material 14 from the group of cuprates and a second material 16. The second material 16 is different from the first material 14 and, in particular, does not include a cuprate. By suitable admixtures of the second material 16, the colour temperature of the light emitted by the component 12 can be adjusted in a desired manner.

Figure 4:
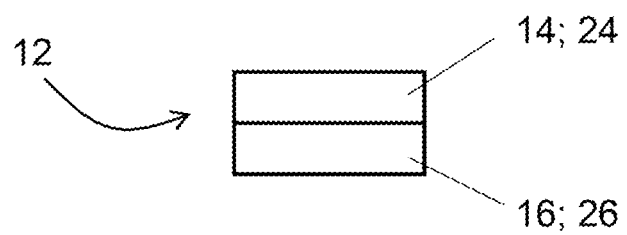
FIG. 4: second configuration of a component.
Figure 5:
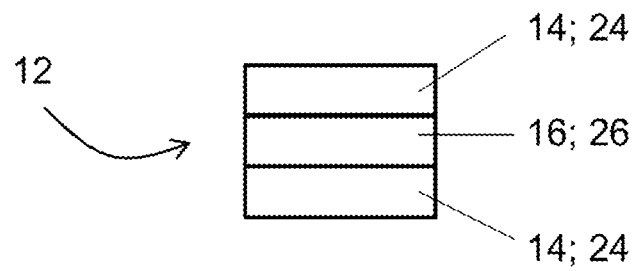
FIG. 5: a third configuration of a component.

FIG. 4 shows a second configuration of a component 12 according to the invention. The component 12 comprises a first region 24 and a second region 26, which are in the form of layers and are directly adjacent to one another. The first region 24 is produced from the first material 14 from the group of cuprates. The second region 26 is produced from the second material 16, which is different from the first material 14 and in particular does not include a cuprate. The coating of the first region 24 with the second material 16 can be done in such a way that the light emission by the component 12 are influenced in a desired manner. For example, a colour temperature of the emitted light may be adjusted in a desired manner FIG. 5 shows a third configuration of a component 12 according to the invention. The component 12 comprises a second region 26, which is sandwiched between two first regions 24, which are in particular of the same type. In particular, the component 12 consists of said region 24 and 26. Again, the first region 24 is produced from the first material 14 from the group of cuprates and the second region 26 is produced from the second material 16, which is different from the first material 14 and in particular does not include a cuprate. The first regions 24 and the second region 26 are arranged in superimposed layers.

The layer thicknesses shown in schematic FIGS. 3 to 5, as well as their ratios, are not to scale. The regions 14 and 16 can have the same or different layer thicknesses. The layer thickness of the first region 14 can be greater than, less than or equal to the layer thickness of the second region 16.

LIST OF REFERENCE SIGNS device 10
component 12
first material 14
second material 16
power supply device 20
first conductor 21
second conductor 22
p first region 24
second region 26
third region 28
protective screen 30
electrical connection unit 35
atmosphere 40
temperature T
temperature Tv

The invention claimed is:

1. A method for generating light in which a component comprising a first material is subjected to an electric voltage and/or an electric field at a temperature (T) below 0° C. such that the component emits light, wherein the emission of light is based on electroluminescence of the first material, wherein the first material includes at least one selected from the group consisting of lanthanum barium copper oxide (LaBaCuO), lanthanum strontium copper oxide (LaSrCuO), yttrium barium copper oxide (YBaCuO), bismuth strontium calcium copper oxide (BiSrCaCuO), bismuth strontium copper carbonate (BiSrCuOCO), thallium barium calcium copper oxide (TlBaCaCuO), mercury barium calcium copper oxide (HgBaCaCuO), mercury thallium barium calcium copper oxide (HgTlBaCaCuO), barium calcium copper oxide (BaCaCuO), barium calcium copper carbonate (BaCaCuCO), and strontium-potassium-copper-oxide-chlorine (SrKCuOCl).

2. The method according to claim 1, wherein the first material is yttrium barium copper oxide.

3. The method according to claim 1, wherein the component has a mass fraction above 0% and at most 50% of a second material.

4. The method according to claim 3, wherein at least one first region of the component consists essentially of the first material and at least one second region of the component consists essentially of the second material.

5. The method according to claim 4, wherein at least one third region of the component comprises a substantially homogeneous mixture of the first material and the second material.

6. The method according to claim 4, wherein the at least one first region is at least one layer and the at least one second region is at least second layer.

7. The method according to claim 1, wherein the electric field has an electric field strength above 100 V/cm.

8. The method according to claim 1, wherein the emission of light takes place in an oxygen-containing atmosphere, wherein the oxygen-containing atmosphere is air.

9. The method according to claim 1, wherein the component is a densified component, wherein the densified component is a sintered component.

10. The method according to claim 9, wherein densification of the densified component is performed by subjecting a starting substance comprising the first material to an electric field at a temperature (Tv) below 800° C.

11. The method according to claim 9, wherein densification of the densified component is performed by subjecting a starting substance comprising the first material to an electric field at a temperature (Tv) below 100° C.

12. The method according to claim 1, wherein the electric field has an electric field strength of between 500 V/cm and 100 V/cm.

13. The method according to claim 1, wherein the temperature (T) is above a transition temperature of the first material.

14. A device for generating light, comprising a component for emitting light and a power supply device for subjecting the component to an electric voltage and/or an electric field for emission of light by the component, wherein the component includes a first material including at least one selected from the group consisting of lanthanum barium copper oxide (LaBaCuO), lanthanum strontium copper oxide (LaSrCuO), yttrium barium copper oxide (YBaCuO), bismuth strontium calcium copper oxide (BiSrCaCuO), bismuth strontium copper carbonate (BiSrCuOCO), thallium barium calcium copper oxide (TlBaCaCuO), mercury barium calcium copper oxide (HgBaCaCuO), mercury thallium barium calcium copper oxide (HgTlBaCaCuO), barium calcium copper oxide (BaCaCuO), barium calcium copper carbonate (BaCaCuCO), and strontium-potassium-copper-oxide-chlorine (SrKCuOCl), wherein the device is configured such that the component has a temperature (T) below 0° C. when light is generated, and wherein the emission of light is based on electroluminescence of the first material.

15. The device according to claim 14, wherein the device comprises cooling means for cooling the component to a temperature (T) below 0° C.

16. The device according to claim 15, wherein the cooling means is configured for cooling an atmosphere surrounding the component such that the component can be cooled by the atmosphere.

17. The device according to claim 14, wherein the component further includes a second material different from the first material, wherein the component has a mass fraction of the first material between 50% and 100% and a mass fraction of the second material above 0% and at most 50%, and wherein a wavelength of the emission of light is based on the second material.

18. The device according to claim 14, wherein the component has a mass fraction above 0% and 99% of a second material included in the component, wherein the second material includes zirconium or hafnium oxide.

19. The device according to claim 14, wherein a mean grain size of the first material is between 0.5 μm and 50 μm.

20. The device according to claim 14, wherein a shape of the component is a straight pin or a dog-bone shape connected by two conductors.

* * * * *